United States Patent [19]

Saunders

[11] Patent Number: 4,837,750
[45] Date of Patent: Jun. 6, 1989

[54] APPARATUS FOR DISPLAYING DEPTH SOUNDING DATA WITH NAUTICAL RANGE

[76] Inventor: Ted G. Saunders, 97 Indian Hill Pl., Fremont, Calif. 94539

[21] Appl. No.: 135,460

[22] Filed: Dec. 21, 1987

[51] Int. Cl.⁴ .............................................. G01S 15/06
[52] U.S. Cl. ..................... 367/111; 367/108; 367/91; 181/124; 73/290 V
[58] Field of Search ................. 367/108, 110, 113, 99, 367/908, 111, 89, 91; 181/124; 73/290 V, 490, 291; 340/621

[56] References Cited

U.S. PATENT DOCUMENTS

| | | | |
|---|---|---|---|
| 3,733,582 | 5/1973 | Eck et al. | 367/95 |
| 3,879,697 | 4/1975 | Richard | 367/94 |
| 4,169,255 | 9/1979 | Hulsman et al. | 367/100 |
| 4,229,798 | 10/1980 | Rosie et al. | 367/908 |
| 4,538,249 | 8/1985 | Richard | 367/94 |
| 4,597,069 | 6/1986 | Milano et al. | 367/95 |
| 4,700,569 | 10/1987 | Michalski et al. | 367/908 |

OTHER PUBLICATIONS

Telescan 2000, Pro Bass Shop Catalog, 1988, pp. 129-131.

Primary Examiner—Thomas H. Tarcza
Assistant Examiner—Daniel T. Pihulic
Attorney, Agent, or Firm—Robert C. Hill; John A. Bucher

[57] ABSTRACT

Apparatus and a method for displaying depth sounding data with nautical range are disclosed for use on vessels or the like, the device including a transceiver for transmitting an acoustic signal downwardly through surrounding water and for receiving echo signals, a motion sensor for determining nautical distance, a microprocessor for storing and conditioning the echo signals and distance signals and a display device for providing an XY display of underwater conditions represented by the echo signals. Range display means associated with or included in the display device and operated by the microprocessor display nautical range of a selected and preferably adjustable point on the X axis. The microprocessor includes a range memory stack, a stack manager and an internal register for storing bytes or distance data for successive vertical scans. The device also preferably includes a differential temperature sensor.

15 Claims, 2 Drawing Sheets

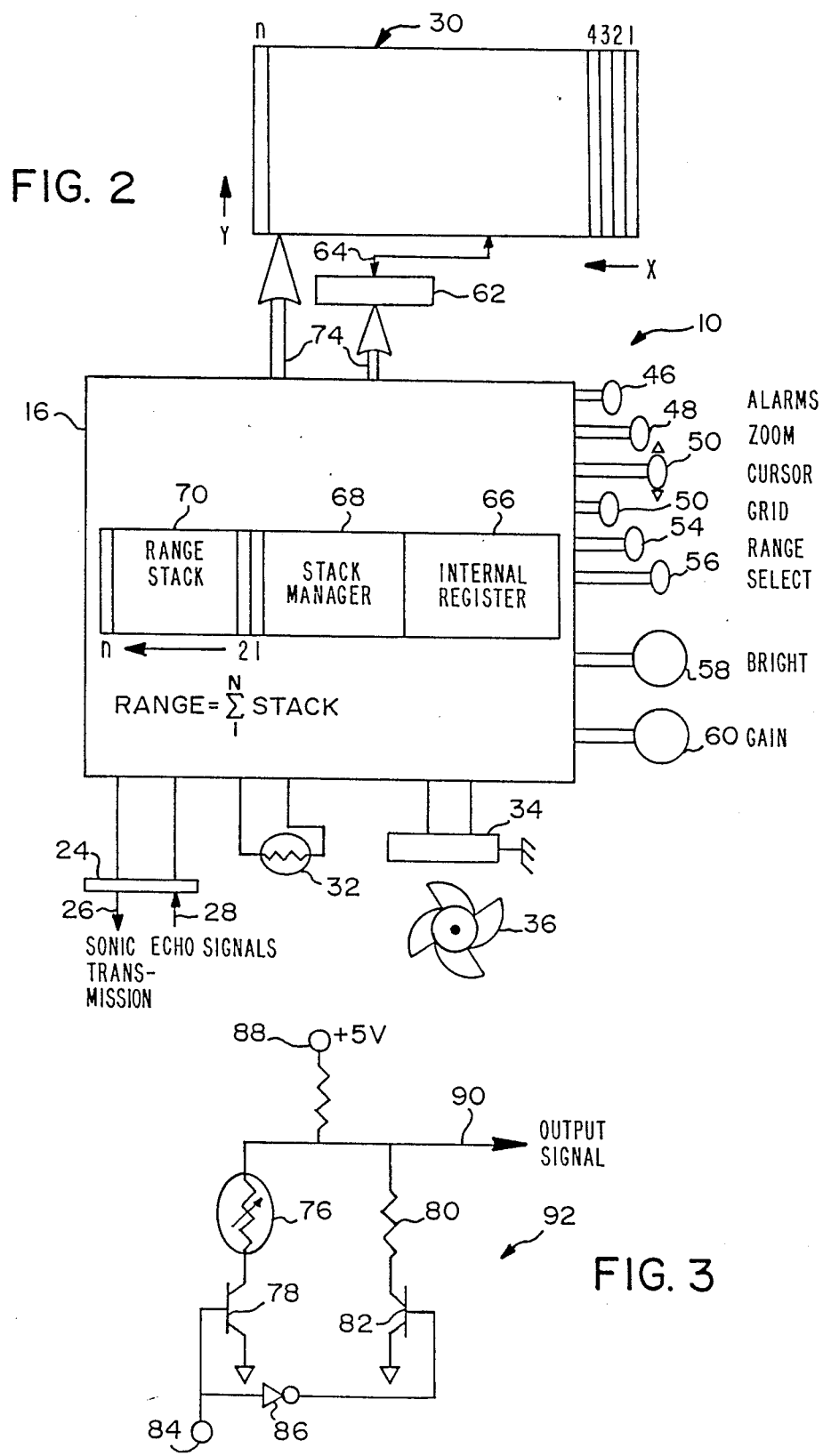

APPARATUS FOR DISPLAYING DEPTH SOUNDING DATA WITH NAUTICAL RANGE

FIELD OF THE INVENTION

The present invention relates to apparatus as well as a method for displaying depth sounding data and more particularly adapted for use on vessels with means for providing an XY display of underwater conditions represented by the depth sounding data.

BACKGROUND OF THE INVENTION

A number of different devices have been provided in the prior art for exploring underwater conditions and more particularly for either detecting the depth of the water beneath a vessel traveling over the water and/or for detecting the presence of fish in the water beneath the vessel.

The present invention is particularly concerned with such devices having a depth sounding or sonar function where radiant energy is transmitted downwardly into the water with echo signals being returned from various reflecting surfaces provided for example by the bottom surface of the water and fish, for example. Depth sounding devices of this type have been disclosed for example in U.S. Pat. No. 3,733,582 issued May 15, 1973 to Eck et al, entitled "Digital Depth Sounder" and U.S. Pat. No. 4,597,069 issued June 24, 1986 to Milano et al, entitled "Depthsounder/Fish Finder". In addition, U.S. Pat. Nos. 3,879,697 and 4,538,249 issued respectively on Apr. 22, 1975 and Aug. 27, 1985 to Richard both disclosed systems employing an ultrasonic Doppler effect for detecting the presence of underwater objects at least partly based upon motion.

The above patents are referenced herein merely to show a variety of different devices for detecting the presence of underwater objects. However, the systems disclosed by the above patents are generally outside of the scope of the present invention. Initially, the present invention is concerned only with devices employing depth sounding or sonar effects rather than Doppler effect systems as disclosed in the latter two patents.

Although the first two patents referred to above do relate to systems employing depth sounding or sonar effects, they do not provide a visual display of the type contemplated by the present invention. Rather, the systems of those two patents produced a digital signal or display which required interpretation by the user in assessing underwater conditions.

A number of prior art systems have been made available which employed depth sounding or sonar effects together with an XY display of a type generally contemplated by the present invention. The earliest of these devices included an XY display in the form of a paper strip chart. In these devices, vertical scans of echo signals were recorded with the vessel in successive locations to produce an XY display corresponding to echo signals from a succession of such scans.

More recently, such devices with paper strip charts have been replaced by electronic devices including microprocessors and either cathode-ray tube (CRT) or liquid crystal display (LCD) for more rapidly and more simply displaying vertical scans of echo signals.

These devices have also included means for measuring nautical distance traveled by a vessel and temperature of the water, for example, and displaying additional information such as nautical speed, distance traveled during an operating period of the device, ambient temperature of the water and depth of the water, for example measured in feet.

Such devices have been found to be very effective for use by fishermen and others, particularly in determining the depth of the water and for detecting the presence of fish in water beneath the vessel.

However, further improvements have been found desirable in such devices in accordance with the present invention. In particular, it was discovered that the user of such devices had difficulty in determining the nautical range or distance of various objects illustrated on the XY display from a base point such as the instant location of the vessel. In the past, it was generally difficult to accurately portray such information. As noted above, the Y axis of the display corresponds to depth in the water while the X axis corresponds to distance from the vessel. However, the distance, more particularly the nautical distance, between the vessel and any point along the X axis of the screen does not remain consistent but tends to vary, for example with varying nautical speed of the vessel and/or the time required for a vertical scan of the echo signal. Accordingly, in the past, users had difficulty in accurately assessing nautical range as portrayed along the X axis of the display.

SUMMARY OF THE INVENTION

It is therefore an object of the invention to provide apparatus and a method for obtaining and displaying depth sounding data with various improvements over the prior art.

It is a further object of the invention to provide improvements in apparatus and a method for displaying depth sounding data with nautical range being continuously calculated by suitable microprocessor means and displayed.

Preferably, the present invention contemplates an improved depth sounding device for use an a vessel or the like on water, the depth sounding device including a transceiver for transmitting an acoustic signal downwardly through the water and for receiving echo signals from the water, motion sensing means also sensing nautical distance traveled by the vessel in the water, a microprocessor storing and conditioning the echo signals and signals from the motion sensor for operating display device to provide an XY display of underwater conditions represented by the echo signals where Y represents depth and X represents travel of the vessel over the water. According to the present invention, the echo signals and motion sensor signals are received and processed with respect to time either by the above microprocessor or additional microprocessor means which operates a display means for displaying nautical range, preferably of a selected point on the X axis of the XY display relative to a predetermined base point. The XY display means is preferably a cathode-ray tube but could also be a liquid crystal or even a strip chart device as referred to above.

The base point is selected more preferably at one end of the X axis, corresponding to an instant location of the vessel. At the same time, the selected point can preferably be adjusted along the X axis by control means suitable for freezing the selected point at an adjusted position along the X axis or for allowing the selected point to return to a predetermined location on the X axis after adjustment.

It is a further object of the invention to provide a depth sounding device wherein successive vertical scans along the Y axis of the XY display are formed in fixed time periods from echo signals received with the vessel in successive locations, the microprocessor including means for storing a number of bytes in a memory stack, the bytes respectively storing the number of pulses or, in effect, distance traveled by the vessel for each vertical scan, the number of bytes in the memory stack equaling the number of vertical scans along the X axis of the XY display. This mode of operation has been found to facilitate overall operation of the depth sounding device while also permitting the determination and display of nautical range information as disclosed above.

It is a still further object of the invention to provide a depth sounding device of improved performance and simplified construction. One of the features allowing improved performance and also simplifying the depth sounding device is a temperature sensor comprising a calibrating resistor corresponding to a predetermined temperature and a thermistor resistor responsive to ambient temperature, a differential circuit means being operable in combination with the microprocessor for coupling the calibrating resistor and thermistor resistor to accurately determine the ambient temperature. The temperature sensor or thermometer of the present invention can be used either in combination with the depth sounding device described above or in other applications. As noted in greater detail below, accuracy of the temperature sensor can further be enhanced by the use of multiple calibrating resistors corresponding to a variety of temperatures if desired.

Additional objects and advantages of the present invention are made apparent in the following description having reference to the accompanying drawings.

BRIEF DESCRIPTION OF THE DRAWINGS

FIG. 2 is a schematic illustration of the depth sounding device better illustrating the manner in which sensors on the vessel are coupled through a microprocessor with suitable XY display means.

FIG. 3 is a circuit diagram of a temperature sensor also employed in combination with the depth sounding device.

DESCRIPTION OF THE PREFERRED EMBODIMENT

Figure 1:
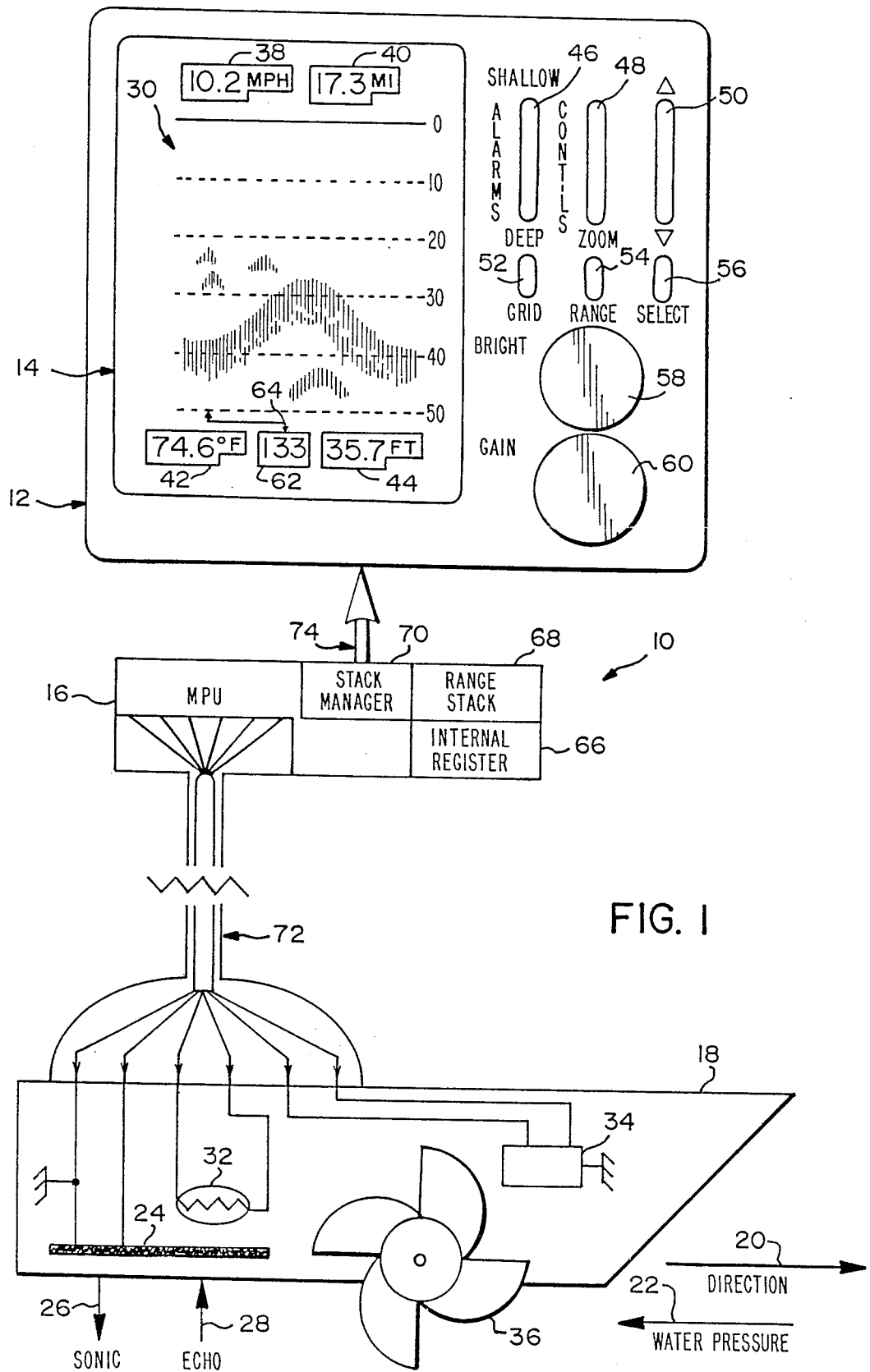
FIG. 1 is a pictorial representation of the depth sounding device of the present invention and illustrating its operation in association with a vessel moving along the surface of the water.

Referring now to the drawings and particularly to FIGS. 1 and 2, the present invention provides a depth sounding device generally indicated at 10 suitable for providing a pictorial display of underwater conditions. More particularly, the depth sounding device 10 can be used in a vessel traveling on water for example to monitor depth of the water and also to provide a visual representation of fish or the like at various underwater depths.

Generally, the depth sounding device 10 includes a display unit 12, preferably comprising a cathode-ray tube (CRT) generally indicated at 14, a microprocessor 16 for processing data and supplying the data to the display unit 12 in a suitable condition for display and various sensors described below which are coupled with the microprocessor and are adapted for monitoring various conditions relative to a vessel schematically represented at 18.

The vessel 18, as viewed in FIG. 1, is contemplated for travel in a direction indicated by an arrow 20 with water pressure accordingly being produced in a direction indicated by another arrow 22.

The various sensors referred to above include a transceiver 24 of a conventional type including means for transmitting a sonic or acoustic signal 26 downwardly through the water and for receiving echo signals 28 from the water. In a manner well known to those skilled in the art, echo signals 28 received by the transceiver 24 can be processed in the microprocessor 16 in a manner for providing a pictorial or XY display of underwater conditions represented by the echo signals. Such an XY display, representing exemplary underwater conditions, is illustrated for example at 30 on the CRT 14 of the display unit 12.

Additional sensors include a temperature sensor or thermometer 32 for sensing temperature of the water as well as a motion sensor 34 for sensing nautical distance traveled by the vessel 18 in the water, preferably by means of a conventional paddle wheel 36 equipped with magnets (not shown). The sensor 34 produces pulses corresponding to the number of revolutions of the paddle wheel 36. Since the output of the sensor 34 is recorded in the microprocessor as a function of time, it effectively operates a display as described below to indicate nautical speed. Accordingly, for purposes of the present invention, the sensor 34 is termed a "motion sensor" although it actually senses nautical distance traveled. In any event, the operation of the motion sensor 34 in combination with the paddle wheel 36 is well known to those skilled in the art for indicating nautical speed of the vessel.

In addition to the XY display 30, data obtained from the sensors 24, 32, and 34 can be stored and conditioned by the microprocessor 16 to respectively provide displays of vessel speed as indicated at 38, nautical distance traveled as indicated at 40, water temperature as indicated at 42 and depth as indicated at 44.

As will be described in greater detail below, the right side of the XY display 30 represents the instant location of the vessel 18 with successive earlier soundings being represented in a leftward direction along the X axis of the display 30. Accordingly, the left margin of the display represents the earliest sounding or, in other words, an underwater display most remote from the vessel 18.

The preceding features and components of the depth sounding device 10 are generally similar to prior art depth sounding devices, at least those including an XY display similar to the display unit 12. However, as will be described in greater detail below, certain features or components of the various units within the depth sounding device 10 are of novel construction and function, at least as employed with the present invention.

Before describing the novel features of the invention in greater detail, it is to be understood that the depth sounding device 10 includes a number of features or capabilities generally similar to depth sounding devices available in the prior art. For example, the microprocessor 16 is operable by a user for displaying a manual or menu (not shown) to assist the user in operation of the depth sounding device 10. The microprocessor 16 can also be operated by various controls located on the display unit 12 and described in greater detail below. The display unit 12 can be operated in a navigational (NAV) mode for replacing the XY or depth display 30 with an enlarged display of navigational data helpful for operating the vessel 18. The XY display 30 can be also be replaced by split screen representations of various types. For example, in one mode of operation, a lower portion of the CRT screen 14 can be dedicated to an enlarged view of the water just above the bottom, this mode of operation commonly being referred to as "bottomlock".

In addition, the display unit 12 can be operated by the microprocessor 16 for providing alarms at various depths, for adjusting the depth represented along the Y axis of the XY display, for providing a grid of depth markers on the XY display and for performing a zoom function with the CRT screen 14 being adapted to provide an enlarged representation of a selected depth. Although these features add to the versatility and utility of the depth sounding device 10, they are not described in greater detail since they are generally similar to prior art features and accordingly are not contemplated as a portion of the present invention.

Available controls on the display unit 12 include an alarm control 46 (with both shallow and deep alarms), a depth-zoom control 48, a cursor control 50, a grid control 52, a range control 54 and a select control 56 as well as a brightness control 58 and a gain control 60. Here again, these controls are operated in generally the same manner as the prior art except for the range control 54 alone and in combination with the other controls, particularly the cursor control 50 and select control 56.

The depth-zoom control 48 is preferably adapted according to the present invention so that as a zoom indicator approaches the bottom surface represented on the XY display 30, it also provides a bottomlock control for producing the split representation on the screen 14 as referred to above under the term "bottomlock".

Novel features and modes of operation according to the present invention are particularly contemplated in connection with internal portions of the microprocessor 16 described in greater detail below and operable particularly in combination with the range control 54 for generally providing information concerning nautical range of a selected point either fixed along the X axis of the display 30 by means of a range display 62 which is preferably at the discretion of the user, as described in greater detail below.

It is also to be understood that the length represented between the left-hand and right-hand extremities along the X axis of the display 30 do not represent a predetermined distance. Such a condition would exist if all variables, particularly vessel speed and depth on the display 30, are maintained constant. However, it is also to be understood that the display 30 includes a specific number of vertical scans, at least within the context of the present invention, each of those vertical scans representing a fixed time period depending upon the depth setting established along the Y axis of the display 30. As noted above, depth on the display 30 is controlled by the depth-zoom control 48 in combination with the cursor control 50.

Even with a given depth setting on the display 30, the distance represented along the X axis can vary, for example depending upon variations in nautical speed of the vessel as indicated at 38. This discussion is also set forth in order to illustrate the general difficulty in accurately determining the nautical range between any two points along the X axis, particularly a selected point as indicated by a range arrow 64 and the right hand margin of the XY display 30 representing the instant location of the vessel 18.

The present invention provides means and a method for allowing the user to precisely display such information on the screen 14 as described in greater detail below.

For purposes of the present invention, the microprocessor is provided with internal components or programming as described below. Initially, the processor is provided with an internal register 66 which counts pulses from the motion sensor during successive vertical scans representing successive soundings obtained through the transceiver 24.

The microprocessor 16 is also provided with a range stack memory 68, preferably a portion of the RAM memory for the microprocessor, adapted for storing separate bytes indicated respectively at 1, 2, etc. through a final byte indicated at n in FIG. 2. The total number (n) of bytes in the range stack memory 68 corresponds to the number of vertical scans along the X axis of the display 30 (see FIG. 1). The range stack memory 68 is operated by a stack manager portion 70 of the microprocessor 16 in a manner so that the number of pulses or, in effect, distance traveled during each vertical scan at successive locations of the vessel 16 are stored in the respective bytes (1) through (n). After all of the bytes (1) through (n) are filled, pulse data corresponding to the next vertical scan are then substituted at one end, for example, in the byte (1) with information in the other bytes being shifted downwardly, information from the last byte, for example that indicated at (n), then being discarded. In this manner, the stack manager 70 causes the range stack memory 68 to effectively store pulse-distance information for the entire XY display 30 on the display unit 12.

The range control 54 is coupled with the microprocessor 16 so that it normally directs the microprocessor to display a range value as indicated at 62 normally corresponding to the nautical distance between the location of the vessel 16 (preferably at the right margin of the XY display 30 and a selected point along the X axis as represented by the range arrow 64). It can further be seen from FIG. 1 that the other end of the range arrow 64 points to the range value 62 to clearly indicate its function to the user.

The selected point represented along the X axis by the range arrow 64 can be adjusted, for example, by operating the range control 54 and then operating the cursor control 50 in either an upward or a downward mode to shift the range arrow 64 leftwardly or rightwardly along the X axis of the display 30. In this manner, the user can select any point along the X axis with the vessel range display 62 tracking that selected point and providing an instantaneous nautical range between that point and the vessel.

The range control 54 and the select control 56 are further adapted so that, after a user has adjusted the position of the range arrow 64, he can then operate the select control 56 in order to return the range arrow 64 to a predetermined point along the X axis, for example the left margin of the display 30. Alternatively, adjustment of the range arrow 64 can be terminated by again operating the range control 54 which then functions to freeze the range arrow 64 at any adjusted position along the X axis. Thereafter, it can of course again be returned to its predetermined location, for example at the left margin of the display 30, by again operating the range control 54 and select control 56 in sequence.

Thus, the internal portions of the microprocessor 16 and the range control 54, either alone or in combination with the cursor control 50 and select control 56, provides a novel combination of functions for providing useful nautical range information on the range display 62 at the user's discretion.

Assembly and operation of the microprocessor 16 as described above permit it to function in combination with the various sensors and display unit 22 to perform the novel functions of the invention. Referring particularly to FIG. 1, sensor data from the sensors is indicated at 72 flowing to the microprocessor 16 while display data processed and conditioned by the microprocessor 16 is indicated at 74 flowing to the display unit 12.

The preceding description is believed sufficient to disclose both the construction and mode of operation for the depth sounding device 10 of the invention. However, it is further noted that the various functions or internal features of the microprocessor 16 allow it to operate under an algorithm for receiving, storing and processing echo signals and pulse-distance information from the sensor 34 as a function of time and in a manner clearly apparent from the above disclosure to those skilled in the art of the invention. The algorithm is generally indicated in mathematical form within the microprocessor 16 in FIG. 2.

The simplified construction and mode of operation contemplated for the depth sounding device 10 of the present invention is particularly exemplified by the circuit construction for the temperature sensor 32 which is described in greater detail below with particular reference to FIG. 3.

As illustrated in FIG. 3, the temperature sensor 32 includes a thermistor resistor 76 preferably responsive to ambient temperature of water beneath the vessel 16 and a corresponding thermistor switch 78. A precision or calibration resistor 80 having, for example, a fixed resistive value equivalent to a selected temperature such as 59 degrees Fahrenheit, and a calibration switch 82 are arranged in parallel with the thermistor resistor 76 and the thermistor switch 78. A calibration control 84 is coupled directly with the thermistor switch 78 and with the calibration switch 82 through an inverter 86. A fixed voltage, for example 5 volts, is applied at the other end of the parallel resistors as indicated at 88 and coupled with an output 90. Various portions of the temperature control 32 are coupled with the microprocessor 16 so that the calibration control 84 causes alternating readings to be taken through the thermistor resistor 76 and the calibration resistor 80.

Thus, the overall circuit indicated at 92 in FIG. 3 and coupled with the microprocessor 16 functions differentially so that signals appearing at the output 90 for either the thermistor resistor 76 or calibration resistor 80 allowing the microprocessor to differentially determine the ambient temperature in the water.

The temperature sensor 32 as described above particularly simplifies assembly and operation of the depth sounding device 10 since no adjustment is necessary, particularly in an oscillator (not shown) for driving the differential circuit 92. Because of the arrangement of the differential circuit 92, any oscillator error appears on both sides of the circuit or differential information and thus cancels out.

The thermometer or temperature sensor 32 is generally as accurate as the values for the resistors 76 and 80. Greater accuracy can be obtained, for example, by using multiple calibrating resistors and respective switches for different temperature ranges, for example, separate resistors calibrated respectively to be equivalent to temperatures of 30 degrees Fahrenheit, 60 Fahrenheit and 90 degrees Fahrenheit. Such an arrangement would eliminate or minimize errors of linearity in the oscillator associated with the temperature sensor.

Thus, there has been described above a novel depth sounding device and mode of operation for monitoring and displaying nautical range of a selected point along the X axis of the XY display illustrated at 30. As described in detail above, additional means are provided for adjusting the selected point along the X axis. In addition, other novel features such as the construction of the temperature sensor 32 have been described more specifically above.

Other modifications and additions are believed clearly obvious from the preceding description. Accordingly, the scope of the invention is defined only by the following appended claims.

What is claimed is:

1. In an improved depth sounding device for use on a vessel on water and having transceiver means for transmitting an acoustic signal downwardly through the water and for receiving echo signals from the water, means for sensing motion of the vessel, a microprocessor device for storing and conditioning the echo signals and signals from the motion sensor, and a display device for receiving data from the microprocessor device and providing an XY display of underwater conditions represented by the echo signals where Y represents depth and X represents travel of the vessel over the water, the improvement comprising microprocessor range means for simultaneously receiving and processing the echo signals and the motion sensor signals, and range display means associated with the XY display of the display device and operated by the microprocessor range means for displaying nautical range of a selected point on the X axis of the XY display relative to a predetermined base point.

2. The improved depth sounding device of claim 1 further comprising means for adjusting the selected point along the X axis.

3. The improved depth sounding device of claim 1 wherein the base point is a point on the X axis of the XY display corresponding to an instant location of the vessel.

4. The improved depth sounding device of claim 3 further comprising means for adjusting the selected point along the X axis.

5. The improved depth sounding device of claim 1 wherein the microprocessor range means is a portion of the microprocessor device.

6. The improved depth sounding device of claim 1 wherein successive vertical scans along the Y axis of the XY display are formed from echo signals received with the vessel in successive locations, the microprocessor storing a number of bytes in a memory stack, the bytes respectively comprising distance data for each vertical scan, the number of bytes in the memory stack approximately equaling the number of vertical scans along the X axis of the XY display.

7. The improved depth sounding device of claim 6 wherein the microprocessor range means comprises an internal register for permitting distance data to be recorded and stored as bytes in the stack.

8. The improved depth sounding device of claim 1 further comprising a temperature sensor, the microprocessor device being coupled with the temperature sensor for receiving and conditioning temperature signals and causing corresponding temperature data to be displayed on the display device.

9. The improved depth sounding device of claim 8 wherein the temperature sensor comprises a calibrating resistor corresponding to a predetermined temperature and a thermistor resistor responsive to ambient temperature, the microprocessor device comprising differential circuit means operatively coupled with the calibrating resistor and thermistor resistor to accurately determine the ambient temperature.

10. A depth sounding device for use on a vehicle on water and having a transceiver for transmitting an acoustic signal downwardly through the water and for receiving echo signals from the water, means for sensing motion or nautical distance traveled by the vessel, a microprocessor for conditioning the echo signals and signals from the motion sensor, and a display device for receiving data from the microprocessor and providing an XY display of underwater conditions indicated by the echo signals where Y represents depth and X represents travel of the vessel over the water, comprising
 range processor means in the microprocessor for simultaneously receiving and processing the echo signals and the motion sensor signals, and
 range display means incorporated in the display device and operated by the range processor means in the microprocessor for displaying nautical range of a selected point on the X axis of the XY display relative to a predetermined base point.

11. The depth sounding device of claim 10 wherein the base point is a point on the X axis of the XY display corresponding to an instant location of the vessel.

12. The depth sounding device of claim 11 further comprising control means for adjusting the selected point along the X axis of the XY display.

13. The depth sounding device of claim 12 further comprising additional control means for respectively freezing the selected point at an adjusted position along the X axis or for returning the selected point to an end of the X axis opposite the base point corresponding to the instant location of the vessel.

14. The depth sounding device of claim 11 wherein successive vertical scans along the Y axis of the XY display are formed from echo signals received with the vessel in successive locations, the microprocessor storing a number of bytes in a memory stack, the bytes respectively comprising distance data from each vertical scan, the number of bytes in the memory stack approximately equaling the number of vertical scans along the X axis of the XY display.

15. The depth sounding device of claim 14 wherein the microprocessor further comprises an internal register for permitting distance data to be recorded and stored by the bytes in the stack.

* * * * *